Oct. 25, 1966 S. OSTROW 3,280,601
METAL FOIL FLASHLIGHT
Original Filed Dec. 13, 1960 2 Sheets-Sheet 1
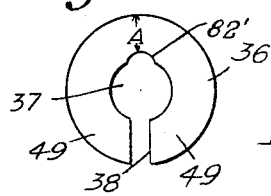
Fig. 3
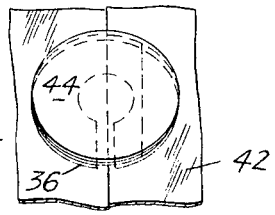
Fig. 4
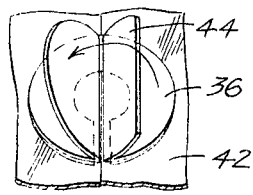
Fig. 4a
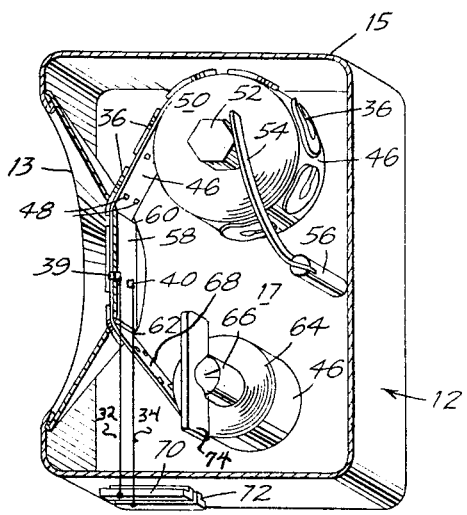
Fig. 2
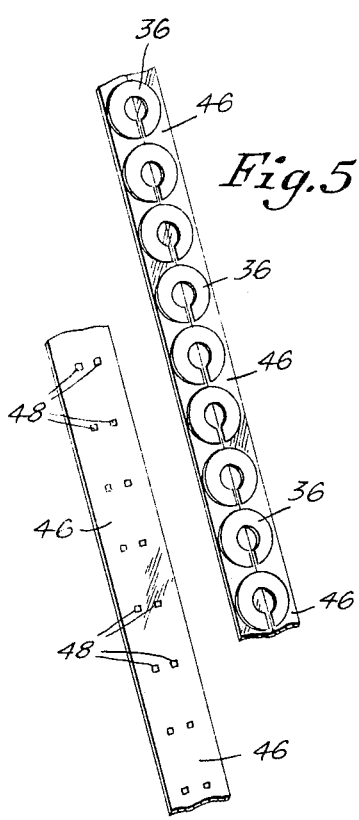
Fig. 5
Fig. 5a
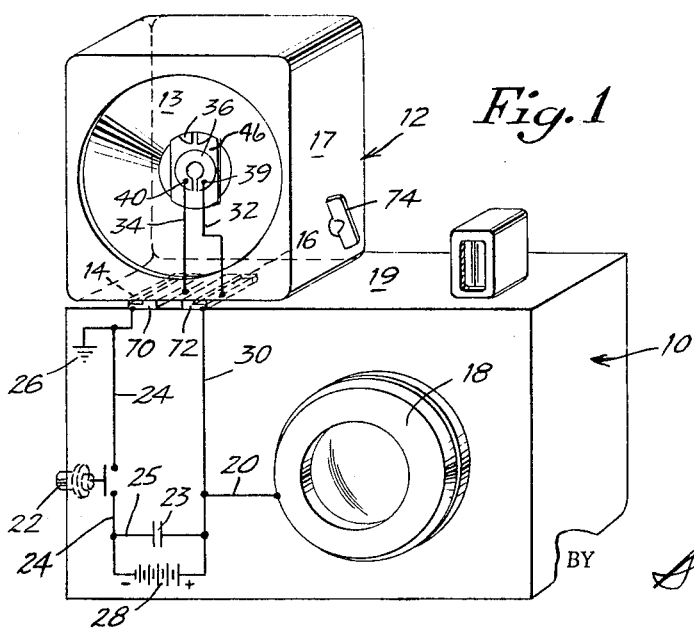
Fig. 1
INVENTOR
Stanley Ostrow,
BY
ATTORNEY Oct. 25, 1966 S. OSTROW 3,280,601
METAL FOIL FLASHLIGHT
Original Filed Dec. 13, 1960 2 Sheets-Sheet 2

INVENTOR
Stanley Ostrow,
BY
ATTORNEY 3,280,601
METAL FOIL FLASHLIGHT
Stanley Ostrow, Silver Spring, Md., assignor, by mesne assignments, to Allen A. Sperling, Washington, D.C. and Silver Spring, Md.
Continuation of application Ser. No. 75,558, Dec. 13, 1960. This application Oct. 26, 1965, Ser. No. 515,287
6 Claims. (Cl. 67—31)

This application is a continuation of copending application Serial No. 75,558, filed December 13, 1960, entitled "Metal Foil Flashlight," now abandoned.

This invention relates to a metal foil flashlighting product, and particularly a flashing foil mounted on a tape. The invention further relates to a device for holding a tape with flash lighting foil mounted thereon operative intermittently for flashing as desired, synchronized with a photographic camera whereby each flash supplies the necessary light for photographing an object. The invention further provides a means for continuously flashing in strip form to produce larger light intensity. The invention further includes the combination of the flashing foil with combustible or explosive means to effect ignition thereof.

According to this invention, I have found that thin metal foil such as from 0.0035 to .0065 inch thick, preferably about .004 to .006 inch suitably notched, can be ignited by an electric current and will burn in air with a sufficient flash for photographic or for ignition purposes.

Metal foils of greater or less thickness require a greater or less igniting current and give a greater or less quality of light including a controlled duration of flash. Thicker metals tend to conduct the electricity from the energizing source without heating the metal to the ignition point in air, so that a metal foil thickness greater than that given requires heavier electrical current for igniting; and foil thinner than that given tends to require metal foil of larger surface area to give a sufficient flash for photographic purposes. Accordingly, the foil thickness limits as given here have been practically selected within these objectives.

The foil for flash purposes needs to be notched as a control to present a limited quantity of metal, at least at one point between the electrodes, so that the metal foil conducting the current will be sufficiently heated by the current passing between electrodes to ignite in air at least at the limited area point. That limited quantity of metal is referred to herein as "notched" since it is readily so formed, merely cutting a portion of the metal with a notch or groove to provide two larger bodies of the metal conductively bridged together by the residual uncut metal portion. That bridging portion of the metal may be formed in any manner so that the term "notching" as used herein is intended in its broadest sense to form a foil into portions bridged together by metal whose smaller area provides greater resistance to current passage.

According to this invention, metal discs of such controlled thickness and suitably reduced or notched to provide a narrow point for ignition purposes can be placed over electrodes conducting current thereto and ignited by applying a moderate breakdown current. Such current is sufficient to heat the metal to igniting temperature at the narrowest notched point, whereby the ignition produces the requisite flash by combustion of the thin metal.

Inasmuch as the metal foil burns very rapidly to produce the flash, it may be mounted upon any backing material for ready handling, even such materials as are themselves combustible. Accordingly, it is useful to mount the thin notched metal foil upon a tape-like backing of any pliable substance such as cellulose tape or organic tape or wrapping film bodies, commercially available as cellophane, Saran, Pliofilm or the like. The metal foil may be coated on one side with an adhesive of any suitable character for securing to the supporting film. The tape may be further perforated for purposes of allowing the electrode to penetrate into current conductive contact with the metal foil. The tape can have as many individual discs of metal foil as desired. The discs are removed one at a time as needed, and fixed upon an electrode and used, or the tape as a roll can be mounted in a holder and unwound at a rate to distribute the discs as carried by the tape over electrodes supported in a typical light reflector including individual means for winding and unwinding the tape as the flashlighting discs are used photographically for each flash. The flash assembly can be suitably mounted on a camera with synchronous actuation switches, synchronized to ignite a flashlight disc when the camera has its photographic paper exposed for taking of a picture.

The several features of the invention are further described in relation to the drawings in which:

FIGURE 1 is a perspective of an assembly of the photograph flashholder hereof with a camera for use in combination;

FIGURE 2 is a perspective of a side elevation of the flashholder assembly with one side opened and in section to show mounting of the tape on reels;

FIGURE 3 is a metal foil disc in a form as it can be notched for individual flash purposes;

FIGURE 4 is a detailed perspective of a single metal foil disc of FIGURE 3 mounted on film backing material such as tape and with an outer removable covering as a laminate thereon;

FIGURE 4a is a similar view illustrating the manner of removal of the outer protective covering which is shown to be partially removed to further illustrate the laminated construction;

FIGURE 5 is a tape assembly of many metal foil discs without protective covering;

FIGURE 5a is a rear view of the same tape as shown in FIGURE 5;

The notched disc flashlight, as well as a squib igniter, is illustrated as a disc 36 in FIGURE 3, which is cut from a thin sheet of metal foil, such as aluminum foil of a thickness as defined above. It may be of any shape notched to a narrow bridging wall section A at the apex of the notch, which integrally joins the foil portions. That narrow wall portion designated by A in FIGURES 3 and 6 can be either a short neck portion at one point above a notch 82, as in FIGURE 6, or as illustrated at 82′ in FIGURE 3. In both cases, the radial dimension is such that the aluminum foil comprising the neck portion of radius A will become hot enough to ignite in air at that point by passage of the electric current momentarily through that neck A or radial dimensioned A ring.

The current is a typical momentary discharge of a condenser to supply a high voltage comprising a several hundred to several thousand volt surge momentarily to effect the heating of the foil at the point A and its ignition and flash combustion in air.

Referring to FIGURE 3, the disc 36 has a central hole 37 cut therein. Dimension A can be approximately the same as the diameter of the hole 37, about ¼ to ½ inch. Disc 36 is cut away at 38, severing the disc, so that the disc 36 is electrically discontinued at this point by the gap formed, dividing adjacent foil parts into legs 49.

Figure 7:
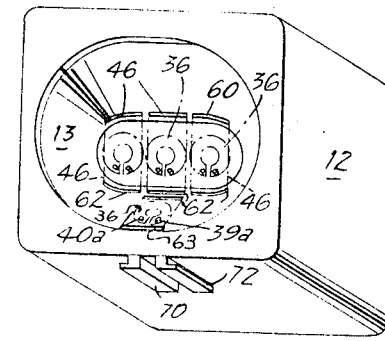
FIGURE 7 illustrates a modification in which a triple flash is obtained by operating three tapes simultaneously.
Figure 8:
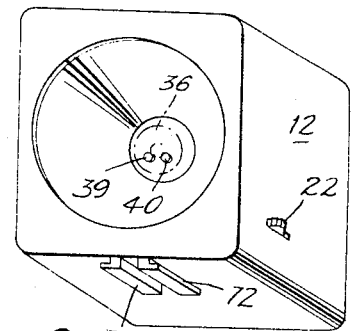
FIGURE 8 is a perspective view of a device in which single foil discs may be mounted for flashlight use.

As shown in FIGURES 1, 7 and 8, the metallic foil disc 36 is mounted over a pair of electrical contacts 39 and 40 in the region of the legs 49 so that a discharge voltage across the electrodes 39 and 40 passes annularly around the disc 36, heating the same to ignition temperature and, almost simultaneously, the disc ignites in air to produce the desired photoflash light. The total quantity of foil metal is controlled to give the desired quantity of heat and light by its combustion.

Each individual foil disc, as shown in FIGURE 3, can be mounted over the electrodes 39 and 40 as shown in FIGURE 8, and ignited by discharging the current therethrough.

For purposes of handling each disc comprising the thin metal foil, they are desirably mounted upon any plastic film or tape-like body 42. As shown in FIGURES 4 and 4a, a protective sheath formed as a disc of paper or plastic film 44 sized to fit is slightly adhered to the top of the metal disc 36 to serve as a protective covering and to allow ready handling of the disc to avoid wrinkling while it is being handled as a single disc in use. The protective sheath 44 is temporarily and only lightly adhered to the metal foil on one outer exposed surface such as with a pressure sensitive adhesive which in turn temporarily and even more lightly adhered to the plastic film base 42 in the same way. In use of this simplified form, the metal foil 36 together with the protective sheath 44 are removed from the base sheet 42 mechanically and the assembly of the sheath 44 and metal foil disc 36 are then pressed upon the electrodes 39 and 40 as shown in FIGURE 8. Thereafter, the protective paper 44 upon the foil is removed as shown in FIGURE 4a by folding upward to two outer edges of the protective sheath 44 and thus to remove it, since it is only slightly adhered to the metal foil. The metal foil disc 36 itself is readily removed since it too is adhered by a pressure-sensitive adhesive only slightly more strongly adhered to the paper sheath than its opposite face to the tape 42. With each flashlight used the metal foil 36 is quickly completely burned to a metal oxide such as aluminum oxide. Thereafter, another metal foil disc is emplaced for use as needed. The protective sheath 44 is desirable for ready handling of the metal foil as an individual disc but it is not essential for the overall operation. Such sheath may be omitted with each disc being handled, somewhat more awkwardly, directly by hand.

In a preferred form and method of use, as shown in FIGURE 5, the discs 36 are mounted on a long plastic tape 46 of any stable flexible material which may be coiled, such as cellophane, Saran or Pliofilm or the like. The discs are suitably spaced as desired, non-critically, but at least out of contact with each other. The tape 46, as shown in FIGURE 5a, has perforations each underlying one of the legs 49, and through which electrodes 39 and 40 are adapted to extend through the tape to contact the complementary legs 49 of the metal disc on the opposite side of the tape to supply igniting current thereto. In this preferred form, advantage is taken of the fact that the metal foil is heated by the electric current and ignites in air so rapidly, in a flash, as to produce adequate light for photographic purposes, but the combustion is so rapid that generally insufficient heat produced in the flash is transferred to the tape support to affect the tape in any way. For this reason, the tape can be of any flexible support material, except materials of inadequate strength and stability to provide the useful support in the presence of the momentary flash. Thus, as the tape carrying the foil is positioned over an electrode and the disc on its exposed face is ignited thereby, the disc becomes hot enough to flash, burns in air with a flash to produce the requisite light, but does not destroy the tape. For this reason, the several discs are most readily handled in the form of the tape and the tape with the discs thereon may be wound in a spool supply of flexible discs. After use of each disc in the sequence of flashes, the residual tape can be wound up upon a receiving spool. In this coiled form, the ignitable metal discs are protected by consecutive coil layers of the plastic base support so that no protective sheath 44 is needed.

For purposes of use, the tape 46 is mounted in a flashlight holder 12. As shown in FIGURE 2, the holder 12 is a rectangular body having built therein an arcuate flash reflector 13 secured in the front wall of the holder 12. A metal strip 15 forms a rectangular edge of the holder and closures 17 are provided for the sides, but any other box-like container constructions will be useful. The tape 46 is coiled upon a spool 50 fixed to a rotary shaft 52. The shaft 52 has one extending end beveled into a polyhedron against which a tensioning spring arm 54 or keeper supported by a bracket 56 bears. The spring arm 54 allows the tape 46 to be unwound from the coil 50 stepwise, uncoiling as each flat surface of the shaft 52 rotates under the spring arm 54. The center portion of the reflector 13 is closed by a vertical plate 58 which has open slots at the tops 60 and 62 through which the tape 46 enters and leaves, thus threaded for exposure of a disc 36 through the center of the reflector 13. The metal foil discs 36 by this construction are thus positioned to be ignited at the center of the reflector 13; that is, in the position shown in FIGURES 1 and 9. For supply of igniting current to the disc 36 in this position, electrodes 39 and 40 comprising two raised electrical contacts are supported in plate 58 extending toward the reflector 13, merely as metallic rounded metal contact bodies which extend away from the inside of plate 58 (not shown) sufficient to penetrate through the perforations 48 in the tape, and electrically contact the metal foil discs 36. The perforations 48 are large enough to allow the protruding contact ends 39 and 40 readily to pass therethrough and electrically contact the metal foil, the tape 46 being supported sufficiently taut for this purpose.

The flash burning of the metal foil does not destroy the tape. Instead, it is passed downward leaving through the lower slot 62 and is rewound upon a spool 64, rotated on spindle shaft 66 supported for rotation in the sides 17 (not shown). To prevent any backlash in the tape 46 being wound and unwound, a second spring arm 68 bears against the spool 64 to maintain continuous tension on the tape. For purposes of completing the electrical current to the electrodes 39 and 40, conduits 32 and 34 extend therefrom to sliding bracket arms 70 and 72 which are cut to slidingly mate with corresponding bracket arms 14 and 16 of any suitable support such as the top 19 of a camera 10 completing the circuit therethrough. For purposes of advancing the tape 46 in winding from spool 50 and rewinding upon spool 64 as the foil discs are used, the spindle 66 has a portion extending through the side wall 17, as shown in FIGURE 1, and is fitted with a winding key or knob 74. Thus, the turning of the key 74 advances each foil disc into the center of the reflector 13 in position ready for use by ignition by current passing through electrodes 39 and 40. FIGURE 1 illustrates a typical camera box 10 having the flash assembly unit 12 of FIGURE 2 mounted thereon by way of slideway brackets 70 and 72 thereof mating with slideway brackets 14 and 16 carried by the camera 10. They provide a ready fastening sliding grip to the camera. The camera has a shutter mechanism 18 electrically synchronized by lead 20 with a flash and camera actuating circuit provided by current source 28. The positive lead of the battery contacts the shutter lead 20 and the bracket 16 by way of lead 30. The bracket 16 further provides current to one of the electrodes 39 by way of brackets 72 and lead 32. The negative electrode of the battery 28 has a lead 24 interrupted by a hand button switch 22 passing to grounder 26 and the second electrode 40 likewise is grounded by way of conduit 34 through the slideway brackets 14 and 16, the latter completing the ground contact 40 through line 34. A condenser 23 in line 25 mounted across the poles of the power source 28 discharges a surging high potential current, highly amplified voltage through the leads 39 and 40 to ignite the disc foil 36 when the current is completed in line 24 through manually pressing the button switch 22. Simultaneously, current completed to shutter 18 will expose the film in the camera for photography. After each such ignition, the key 74 will be turned to position another foil disc 36 for ignition over the electrodes 39 and 40 in the center of the reflector 13. The flashing continues in this manner stepwise as each picture is taken through shutter 18 of the camera.

For additional light, several foil discs supported on several tapes 46 in a modified construction as shown in FIGURE 7, can be aligned for simultaneous flash with a larger reflector 13, thereby giving as much increased light as may be needed by use of several foil ignitions effected simultaneously. As further shown in FIGURE 7, the center tape 46 can have two foil discs 36 aligned on the same tape entering through an upper slot 60 but passing to the forward end of the reflector 13 to leave by a frontally displaced slot 62 therein. A second set of electrodes 39a and 40a are mounted substantially horizontally in the lower part of the reflector 13 so that upon ignition of the lower foil disc 36 lying substantially horizontally at the bottom of the reflector, the light is projected upward toward the ceiling to give a bounce illumination effect. The horizontally lying foil, or both horizontal and vertical can be ignited for controlled flash illumination as desired. In this manner it is possible with versatility to provide light directed above the photographic object toward the ceiling or light directed toward the object from the center of the reflector or to provide double or triple illumination alternately both directly on the object and indirectly from the ceiling to give substantially increased illumination from a single tape which has two discs or several tapes ignited at once.

It is sometimes desirable to mount and operate the flashlight independently of the camera. For this purpose separate handle means (not shown) can be provided beneath the flash box 12 and to the same effect, the box 12 can be independently held and operated by movement of a hand switch 22 as in FIGURE 9.

Figure 6:
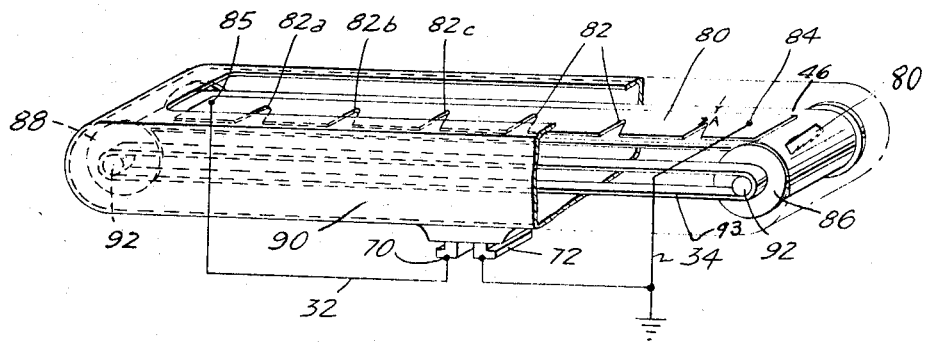
FIGURE 6 illustrates a modified foil tape holder for flashing an extended tape length.

It is sometimes desirable for extra large flash effect to provide a substantially greater quantity and surface area of metal foil 80 for ignition, as in FIGURE 6. For this purpose a length of metal foil such as aluminum has a series of notches 82 cut in from one edge to provide a narrow continuous bridging portion. Above the notches 82 electrical activating current is applied through leads 84 and 85 in circuit with lead 34 which is grounded and lead 32. These in turn supply current from the supporting bracket elements 70 and 72 as described above, upon ignition of such strip, each of the notched portions 82a, 82b, 82c, etc., becomes a primary source of ignition so that the entire strip 80 burns from a plurality of igniting points giving it a flash of greater intensity, but without substantially prolonged burning time. In use, such metal foil strip 80 is mounted on an organic plastic tape 46 as described above and may be unwound from a spool 86 upon which it is wound and the supporting side walls of a housing 90 through spindles 92 journaled in an inturned supporting flange 93. The entire assembly is then mounted to a camera through the sliding bracket ways 70 and 72 as shown in FIGURE 1. That construction of FIGURE 6 can be further modified, of course, for operation by surrounding further with a large reflecting shield, as obvious to one skilled in the art.

The flash discs 36 of metal foil are extremely reliable to ignite and produce a desired flash of suitable strength as described.

As thus described, a metal foil shaped as desired such as a disc or elongated as a tape or other shape of selected area and thickness, but notched so that at least a portion comprises a bridge sufficiently narrow to be heated to ignition by an igniting current passed therethrough. The foil may be used as individual discs mounted for convenience on a tape backing from which they can be removed and ignited by being mounted upon electrodes for flashlight use. The foils can be mounted as a series of discs adhered to an organic film tape from which each are ignited electrically by electrodes passing through perforations therein to contact each metal foil disc in sequence, whereby the tape may be used in coiled form mounted in a flashlight holder and advanced in a series through the center of a reflector and then ignited for flashlight use. The foil can be of any ignitable metal such as magnesium, zinc, iron, cobalt, and the like, which will burn in air.

Various modifications will occur to those skilled in the art. The several constructions given herein being intended as exemplary and not limiting except as defined in the claims appended hereto.

What is claimed and desired to be secured by United States Letters Patent is:

1. An actinic light producing device for photography comprising a carrier of electric insulating material, and a series of spaced metallic annular bodies having the thickness of metal foil distributed in spaced relationship over the surface of said carrier, each of said bodies having a pair of legs separated by a non-conductive gap for establishing electrical connection to said body and a central section joining said legs, said central section including a notch providing a reduced cross section whereby said body may be ignited at a predetermined location by the passage of large quantities of electrical current through said body.

2. An actinic light producing device for photography comprising a continuous non-conductive supporting base formed of organic plastic film and a series of metallic annular foil bodies secured to said base and disposed along its length, each separated a substantial and equal distance from the other, each foil body being notched inward from an edge and having a gap portion at a point remote therefrom dividing the foil body into adjacent legs separated by a notched portion of increased resistance, said organic plastic film having a series of perforations through which electrical contact is made with said foil body for ignition thereof, said perforations being disposed in pairs on opposite sides of said gap, each perforation of a pair being covered by one of the adjacent foil legs formed by said notch and said gap.

3. A device as defined in claim 2 wherein the metal foil has a thickness in the range of about 0.0035 to about 0.0065 inch.

4. A device as defined in claim 2 wherein the metal foil comprises a rounded disc having its center portion cut away, said gap portion being non-conductive and being formed by severing one point of said disc, and said supporting base is an elongated plastic non-conductive tape.

5. A device as defined in claim 2 wherein the organic film is an elongated tape having said pairs of perforations disposed along its length, each perforation of a pair being disposed in back of one of the adjacent legs formed by said gap, each foil body being oriented on said tape so that the gap extends longitudinally thereof.

6. A metal foil flashlight device comprising a series of thin metal annular foil bodies mounted upon a non-conductive film supporting base therefor, each foil body being notched inward from an edge and having a gap portion at a point remote therefrom dividing the foil body into two leg portions separated by a narrowed bridge portion, said film supporting base having a pair of perforations cut inward through its body exposing a portion of the overlying metal foil body of each leg portion through one of said perforations.

References Cited by the Examiner

UNITED STATES PATENTS

| | | | |
|---|---|---|---|
| 720,073 | 2/1903 | Schmitt et al. | 102—28 |
| 1,274,009 | 7/1918 | Courtier | 67—31 X |
| 2,571,799 | 10/1951 | Van Uden et al. | 67—31 |
| 2,981,088 | 4/1961 | Kaprelian | 67—31 |
| 3,143,069 | 8/1964 | Ostrow. | |

FOREIGN PATENTS 581,316   8/1959   Canada.

FREDERICK L. MATTESON, Jr., *Primary Examiner.*

R. A. DUA, *Assistant Examiner.*